March 27, 1956 C. A. BARATELLI 2,739,698
SPECTACLE CASE
Filed Aug. 27, 1952 2 Sheets-Sheet 1
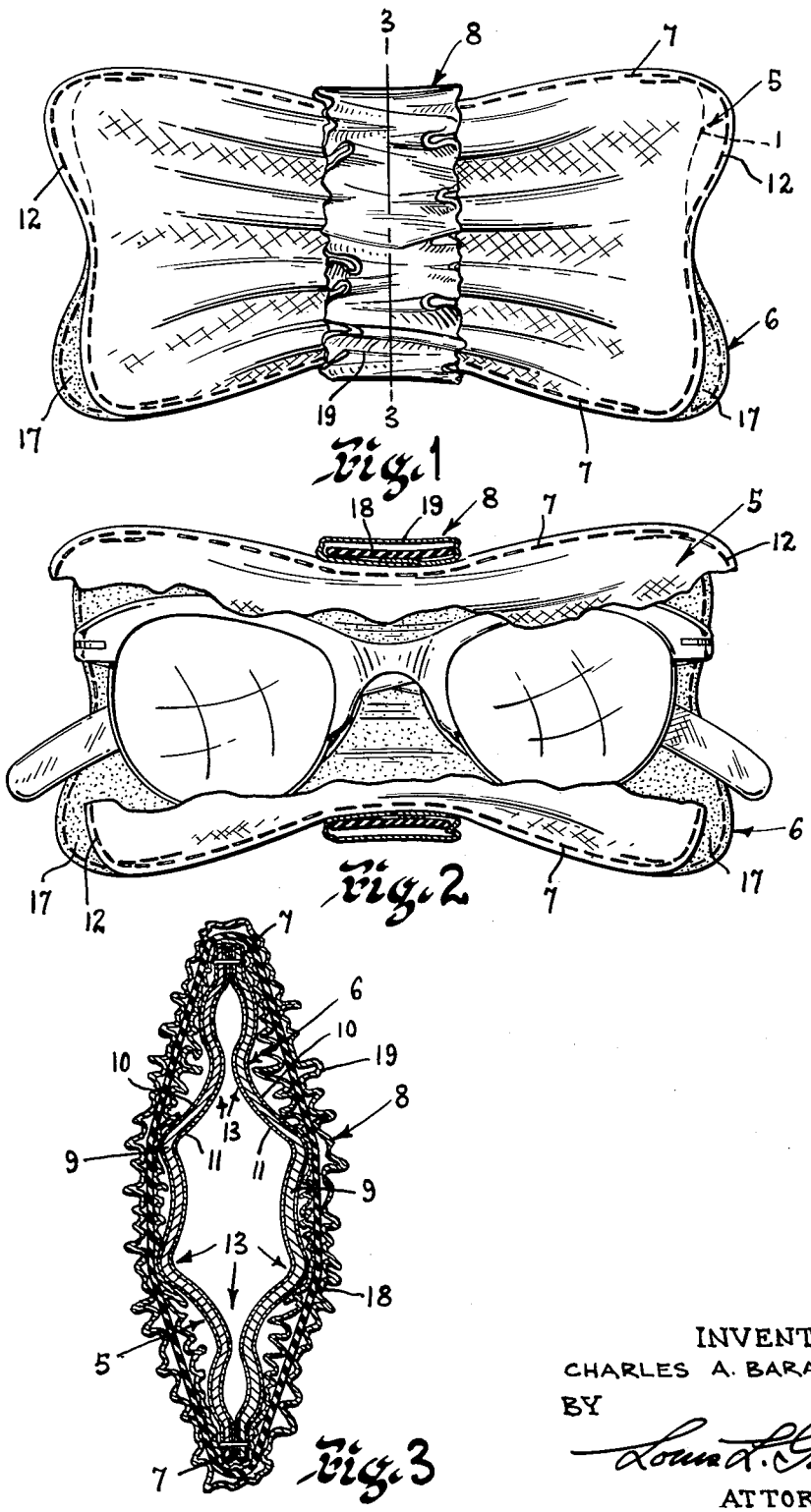
INVENTOR
CHARLES A. BARATELLI
BY
Louis L. Gagnon
ATTORNEY March 27, 1956  C. A. BARATELLI  2,739,698
SPECTACLE CASE Filed Aug. 27, 1952  2 Sheets-Sheet 2

INVENTOR
CHARLES A. BARATELLI
BY
Louis L. Gagnon
ATTORNEY

United States Patent Office 2,739,698
Patented Mar. 27, 1956

2,739,698

SPECTACLE CASE

Charles A. Baratelli, Southbridge, Mass., assignor to American Optical Company, Southbridge, Mass., a voluntary association of Massachusetts Application August 27, 1952, Serial No. 306,624

4 Claims. (Cl. 206—5)

This invention relates to improvements in cases and has particular reference to protective cases for spectacle frames or the like and method of forming the same.

A principal object of the invention is to provide an expandable protective case in which an ophthalmic mounting may be quickly and easily placed and which will inherently retain the mounting therein.

Another object is to provide a case with open ends in which a spectacle frame may be inserted or removed from either end.

A further object is to provide a case with open ends having leading edges for aiding in placing the spectacles therein.

A further object is to provide a case of this nature which may be cheaply and easily fabricated and in which a spectacle frame may be held securely without the use of flaps with fastening means, hinged covers or the like.

A still further object is to provide a simple and economical method of forming a case of the above nature.

Other objects and advantages of the invention will become apparent from the following description taken in connection with the accompanying drawings, and it will be apparent that many changes may be made in the details of construction, arrangement of parts and method shown and described, without departing from the spirit of the invention as expressed in the accompanying claims. I, therefore, do not wish to be limited to the exact details of construction and method shown and described as the preferred forms only have been given by way of illustration.

Referring to the drawings:

Fig. 1 is a plan view of a spectacle case embodying my invention;

Fig. 2 is a view similar to Fig. 1, with a portion of the case broken away, the resilient band shown in section and a spectacle frame positioned therein;

Fig. 3 is an enlarged sectional view as taken on lines 3—3 of Fig. 1;

Figure 4:
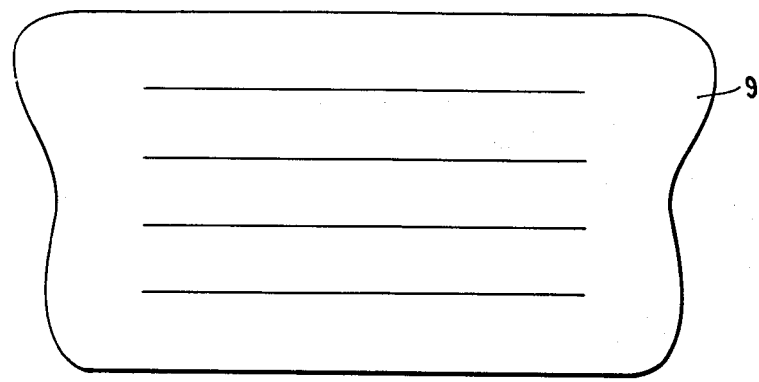
Fig. 4 is a plan view of a blanked out stiffener member which forms part of the wall portions of the case.
Figure 5:
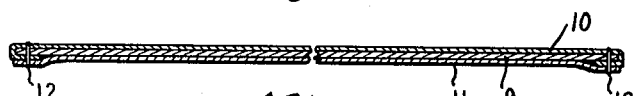
Fig. 5 is a sectional view of a complete wall portion with the cover and lining secured thereto.

Referring more particularly to the drawings wherein like characters of reference designate like parts throughout the several views, the case embodying the invention is composed broadly of two expandable and collapsable wall sections 5 and 6 secured together along their respective longitudinal edges by adhesive, stitchings or other suitable means 7, and having an encircling elastic band member 8 positioned substantially midway of the ends thereof. The walls 5 and 6 are substantially identical in contour shape and comprise an inner stiffening member 9, as shown in Fig. 4, which is adapted to be blanked out of substantially flat sheet material such as pressed paper, leather, fibre or any suitable material which has the inherent characteristic whereby it may be pressed, under heat if necessary, to different shapes or convolutions and which will tend to retain such shape thereafter and yet respond to the function of the resilient band 8. The inner member 9 is provided on one side with a covering 10 which, when the walls are in assembled relation, will form the outside of the case. The covering 10 may be of any desired flexible material such as cloth, leather, plastic, etc. and may be of any desired color or design. The covering 10 is preferably secured to the inner member 9 by means of cement or the like. On the opposed side of the member 9, there is secured, by cement or the like, a covering 11 which, when the walls 5 and 6 are secured together, will form the inner side of the case. This covering is preferably formed of a soft material such as flannel or velvet so that a soft contacting surface will be provided for receiving a spectacle frame.

To prevent the edges of the coverings 10 and 11 from lifting or loosening from the member 9, it is desirable to stitch around the ends of the walls, as shown in Figs. 1, 2, 5 and 7, and designated by the numeral 12.

The wall sections 5 and 6, before being secured together, are subjected to an embossing or crimping operation to provide convolutions 13 extending longitudinally of the central areas thereof to render said area expandable and contractable and to provide resilient spectacle frame holding means within the case. This is best shown in Fig. 3.

Figure 6:
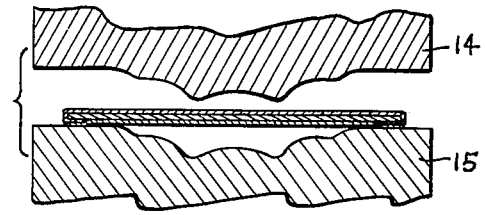
Fig. 6 is a fragmentary view of a die for forming the convolutions in the wall portions.

The convolutions 13 may be formed in the walls 5 and 6 by means of pressing the said walls between heated dies or the like 14 and 15 as shown in Fig. 6. If desired, the inner stiffening members 9 may be scored, as shown in Fig. 4, to aid in forming the convolutions.

Figure 7:
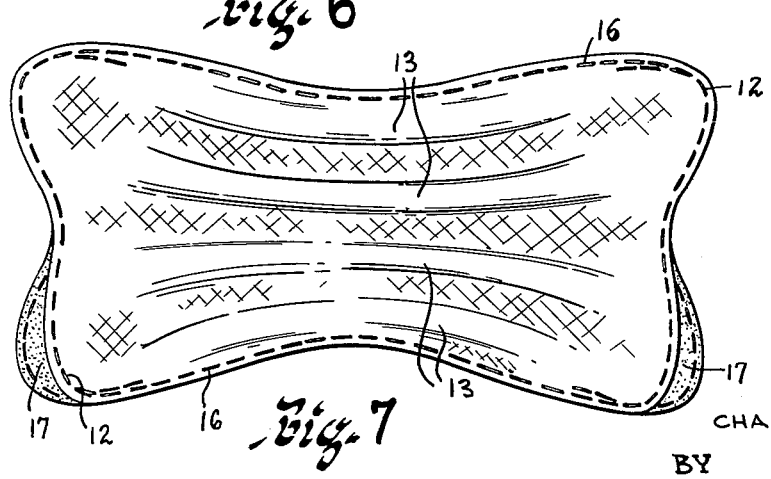
Fig. 7 is a plan view of the walls reversely related and sewn or otherwise secured together.

The wall sections 5 and 6, after the longitudinal convolutions have been formed therein are secured together by means of the stitchings 16 or other suitable means along the opposed side edges only, as shown in Fig. 7, thereby leaving both ends of the case open.

The wall sections 5 and 6 are formed with one longitudinal side edge of a greater length than the opposed side edge and when assembling the walls together, the long side edge of one wall section is secured to the short side edge of the other. This will provide a leading surface 17 of one wall section extending beyond the opposed wall section against which a spectacle frame may be placed when starting to insert the frame within the case. This will aid in inserting the frame within the case as it will tend to steer the frame into the pocket. Also, due to the shape and assembly of the walls, it will be seen that no matter how the case is picked up or by which hand or from which end the frame is started in, there will always be a leading surface to rest the frame against.

The elastic member 8 which is adapted to be placed about the walls 5 and 6, is composed of an inner band 18 formed of elastic tape or the like which is cut to the desired length and the ends secured together to form a continuous circular band of a diameter which is such that when in normal unstretched condition, it will be of a smaller dimension than the outer periphery of the wall sections 5 and 6.

Figure 8:
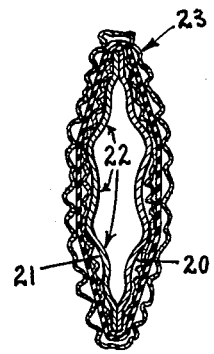
Fig. 8 shows a modified form of the invention.

The inner band 18 is provided with a covering 19 which is cut and sewed to form a tube in which the inner band 18 is adapted to be placed before its ends are secured together. The covering 19 may be made of any suitable material such as cloth, leather, plastic, etc. and may or may not match the material of the outer covering 10 of the walls 5 and 6 depending upon the desires of the individual. When the outer covering 19 and the inner band 18 are in assembled relation with each other, the ends of each are separately secured together thereby forming a continuous hollow tube with an elastic band positioned internally thereof. The outer covering 19 will be formed to a substantially greater diameter than the inner band 18 so that it will allow the inner band to be stretched and positioned about the walls 5 and 6 where it will yieldingly restrict the expanding characteristics thereof. The spectacle case embodying the present invention may be made in the modified form shown in Fig. 8, wherein instead of using an inner stiffening member 9, the walls 20 and 21 are formed of a single sheet of thin pliable material such as leather, cloth, plastic or the like and in which the convolutions 22 are inherently formed by the resilient action of the outer band 23, when said band is placed about the center of the walls.

From the foregoing description, it will be seen that I have provided a spectacle case which is simple and easy to manufacture and which will embody inherent frame retaining characteristics and one in which a frame may be readily placed or removed.

Having described my invention, I claim:

1. A spectacle case comprising two separate wall sections having opposed longitudinal edge portions of similar shapes, said wall sections being secured together in lapped relation along said longitudinal edge portions to form a case having opposed open end portions through either of which a pair of spectacles may be inserted and which open end portions because of the shape of the longitudinal side edges of the wall sections have a greater width than the portion of the case intermediate its opposed open ends, and each of said wall sections having convolutions extending longitudinally of said intermediate area thereof toward the opposed open ends of the case and for a distance equalling the major portion of the length thereof, said wall sections being shape-retaining but of a sufficiently flexible nature to permit expanding and contracting of said longitudinally extending convolutions in lateral directions to accommodate the entrance and removal of spectacles through said open ends, and a resilient band carried by said case which extends about said intermediate portion thereof of narrower width to maintain said longitudinally extending convolutions in a normally contracted relation to restrict the area between the wall sections and bear against the spectacles which have been inserted into said area of the case and so hold said spectacles against dislodgment.

2. A spectacle case comprising two separate wall sections having opposed longitudinal edge portions similarly shaped along reverse curves and arranged in lapped relation, a line of stitching securing said lapped longitudinal edge portions together to form a case having opposed open end portions through either of which a pair of spectacles may be inserted and which open end portions because of said reverse curve shape of the longitudinal side edges of the wall sections have a greater width than the portion of the case intermediate its opposed open ends, and each of said wall sections having convolutions extending longitudinally of said intermediate area thereof toward the opposed open ends of the case and for a distance equalling the major portion of the length thereof, said wall sections being shape-retaining but of a sufficiently flexible nature to permit expanding and contracting of said longitudinally extending convolutions in lateral directions to accommodate the entrance and removal of spectacles through said open ends, and resilient means carried by said case extending laterally of said intermediate portion of the case of narrower width, said resilient means maintaining said longitudinally extending convolutions in a normally contracted relation to restrict the area between the wall sections and bear against the spectacles which have been inserted into said area of the case and hold said spectacles against dislodgment.

3. A spectacle case comprising two separate wall sections having opposed longitudinal edge portions similarly shaped along reverse curves and secured in lapped relation along said longitudinal edge portions to form a case having opposed open end portions through either of which a pair of spectacles may be inserted and which open end portions because of said reverse curve shape of the longitudinal side edges of the wall sections have a greater width than the portion of the case intermediate its opposed open ends, said wall sections having one longitudinal edge of greater length than their other longitudinal edge, the longer longitudinal edge of one wall section being secured to the shorter longitudinal edge of the other wall section to provide a leading surface extending beyond the other wall section of the case against which the spectacles may be rested in inserting the spectacles through either open end, and convolutions formed in said wall sections extending longitudinally of said intermediate area thereof toward the opposed open ends of the case and for a distance equalling the major portion of the length thereof, said wall sections being shape-retaining but of a sufficiently flexible nature to permit expanding and contracting of said longitudinally extending convolutions in lateral directions to accommodate the entrance and removal of spectacles through said open ends, and resilient means carried by said case and extending laterally of said intermediate portion thereof to maintain said longitudinally extending convolutions in a normally contracted relation to restrict the area between the wall sections and bear against the spectacles which have been inserted into said area of the case and hold said spectacles against dislodgment.

4. A spectacle case comprising two separate wall sections having opposed longitudinal edge portions similarly shaped along reverse curves and secured in lapped relation along said longitudinal edge portions to form a case having opposed open end portions through either of which a pair of spectacles may be inserted and which open end portions because of said reverse curve shape of the longitudinal side edges of the wall sections have a greater width than the portion of the case intermediate its opposed open ends, and each of said wall sections having convolutions permanently impressed therein and which extend longitudinally of said intermediate area thereof toward the opposed open ends of the case and for a distance equalling the major portion of the length thereof, said wall sections being shape-retaining but of a sufficiently flexible nature to permit expanding and contracting of said longitudinally extending convolutions in lateral directions to accommodate the entrance and removal of spectacles through said open ends, and a resilient band carried by said case and extending laterally of said intermediate portion thereof to maintain said longitudinally extending convolutions in a normally contracted relation to restrict the area between the wall sections and bear against the spectacles which have been inserted into said area of the case and hold said spectacles against dislodgment.

References Cited in the file of this patent

UNITED STATES PATENTS

| | | |
|---|---|---|
| 1,699,712 | Pratt | Jan. 22, 1929 |
| 1,996,562 | Biddle et al. | Apr. 2, 1935 |
| 2,037,175 | Northcross | Apr. 14, 1936 |
| 2,533,829 | Merryweather | Dec. 12, 1950 |

FOREIGN PATENTS

| | | |
|---|---|---|
| 252,252 | Switzerland | Sept. 16, 1948 |